Jan. 7, 1930.  W. E. DEAN  1,742,379
FLUID PRESSURE BRAKE
Filed Oct. 16, 1928
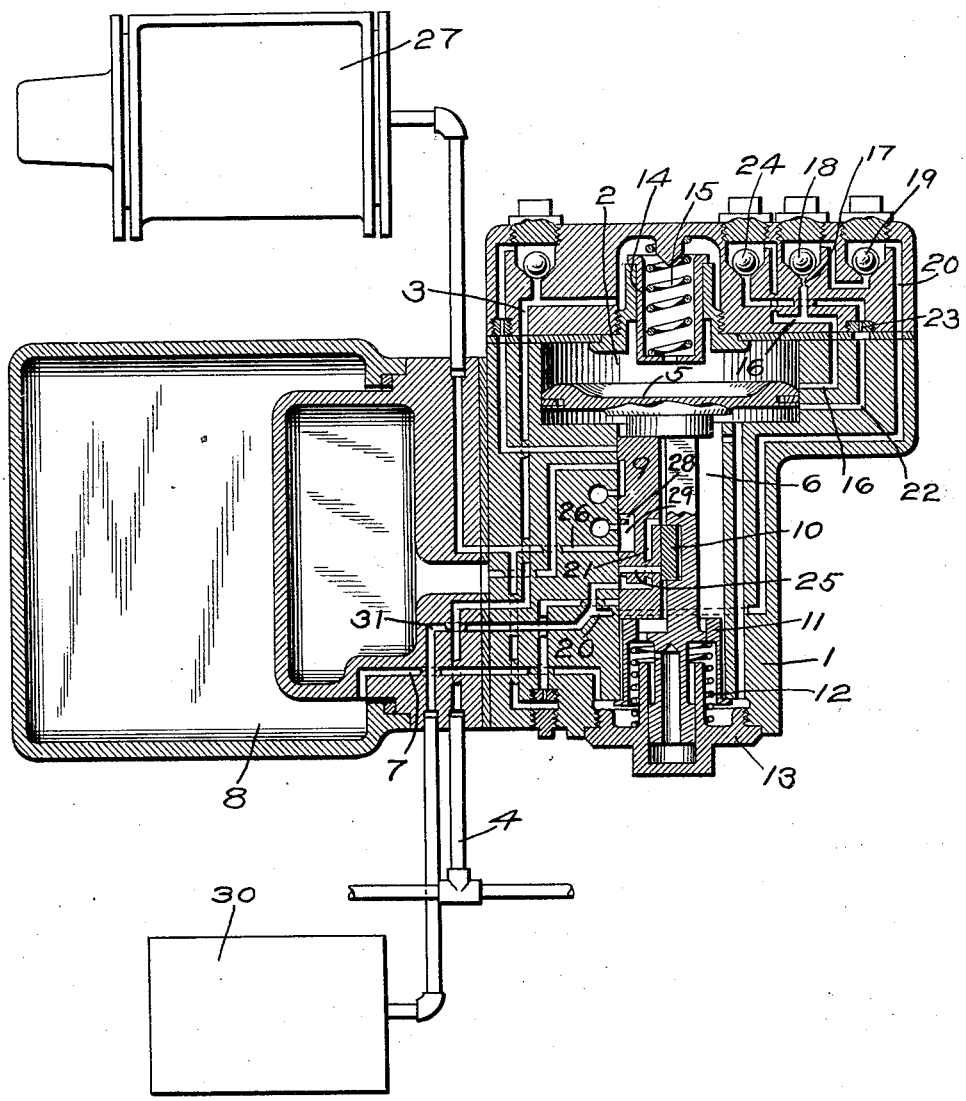
INVENTOR
WILLIAM E. DEAN
BY Wm. M. Cady
ATTORNEY Patented Jan. 7, 1930

1,742,379

UNITED STATES PATENT OFFICE

WILLIAM E. DEAN, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID-PRESSURE BRAKE

Application filed October 16, 1928. Serial No. 312,782.

This invention relates to fluid pressure brakes, and more particularly to a triple valve device of the retarded release type.

It has heretofore been proposed to provide a retarded release triple valve device in which the auxiliary reservoir is charged or recharged with fluid under pressure from the brake pipe at a greater rate in the full release position than in the retarded release position.

According to one feature of my invention, it is proposed to provide the same rate of recharge in the quick release position as found proper for the retarded release position. The rate of recharge provided in the retarded release position will govern the recharge throughout a train of lengths up to forty cars or so and a faster rate of recharge in quick release position is of no benefit but is actually a detriment with respect to securing a prompt release of the brakes at the rear of a long train because when the triple valve devices at the front portion of the train move to full release position, fluid under pressure is taken from the brake pipe at each triple valve in full release position at such a high rate as to prevent the necessary rate of increase in brake pipe pressure at the rear of the train, as required to ensure a prompt and uniform release of the brakes.

In the accompanying drawing, the single figure is a diagrammatic, sectional view of a triple valve device embodying my invention.

As shown in the drawing, the triple valve device may comprise a casing 1, having a piston chamber 2 connected through passage 3 with the usual brake pipe 4 and containing piston 5 and having a valve chamber 6 connected through passage 7 with the usual auxiliary reservoir 8 and containing a main slide valve 9 and a graduating slide valve 10, adapted to be operated by piston 5.

For retarding the release of the brakes, the triple valve device is provided with a retarding stem 11, which is mounted in the rear of valve chamber 6 and is adapted to engage the main slide valve 9. A retarded release spring 12 is interposed between a screw plug 13, which closes the end of the valve chamber 6, and the stem 11 and urges the stem forwardly.

The usual graduating stem 14, subject to the pressure of a spring 15, is adapted to be engaged by piston 5, when the piston moves out to effect a service application of the brakes.

A charging passage 16 leads from piston chamber 2, through a restricted portion 17 and past ball check valves 18 and 19 to a passage 20 which leads to the seat of main slide valve 9. In both retarded and full release positions of the slide valve 9, the passage 20 is connected with a port 21 extending through the slide valve 9.

In the full release position of the piston 5, a passage 22 is open to the valve chamber 6 and communicates, through a restricted portion 23 and a ball check valve 24 with passage 16.

In operation, fluid under pressure supplied to the brake pipe 4, flows to piston chamber 2, and with the piston 5 in release position, fluid flows from piston chamber 2 through passage 16, past the check valves 18 and 19, to passage 20 and thence through port 21 in slide valve 9 to valve chamber 6, so that said valve chamber and the auxiliary reservoir 8 are charged with fluid under pressure.

Upon making a gradual reduction in brake pipe pressure to effect a service application of the brakes, the piston 5 is moved out, first shifting the graduating valve 10, so as to close the port 21 and open the service port 25. The main slide valve 9 is then moved until the piston 5 engages the graduating stem 14. In this position, the service port 25 registers with passage 26, so that fluid under pressure is supplied from valve chamber 6 and the auxiliary reservoir 8 to the brake cylinder 27, to effect a service application of the brakes.

To release the brakes, the brake pipe pressure is increased. On cars toward the head end of the train, where the rate of increase in brake pipe pressure is high, the triple valve piston 5 is moved to retarded release position, compressing the retarded release spring 12 by rearward movement of the retarding stem 11. In this position, fluid is released from the brake cylinder, through a restricted tail port 28, leading to exhaust cavity 29, so that the exhaust of fluid from the brake cylinder is at a slow rate.

On cars toward the rear of the train, where the rate of increase in brake pipe pressure is less rapid, the triple valve piston 5 moves only to full release position, as determined by engagement of the slide valve 9 with the retarding stem 11. In this position, which is that shown in the drawing, fluid is released from the brake cylinder at a more rapid rate, through the unrestricted cavity 29.

It will now be noted that no feed groove is provided around the triple valve piston 5 and the recharge of the auxiliary reservoir from the brake pipe can take place only through the passage 16, and past the check valves 18 and 19 to passage 20. It will also be noted that the recharge of the auxiliary reservoir takes place at the same rate both in full release and retarded release positions, since the recharge in both cases is effected through the same passage 16.

Since fluid is not taken from the brake pipe at a faster rate when the triple valve is in full release position, the brake pipe pressure is permitted to build up at a faster rate on cars toward the rear of the train and consequently, the release of the brakes is accelerated at the rear of the train and a more uniform release of the brakes throughout the train is thus effected.

In order to avoid undesired applications of the brakes due to erratic feed valve action or changing rates of leakage from the brake pipe, the passage 22 is provided, so that slight reductions in brake pipe pressure due to the above causes will be prevented from moving the triple valve piston 5, since fluid in the auxiliary reservoir can flow back to the brake pipe to equalize the pressures, by way of passage 22, past check valve 24, and passage 16.

The restricted passage 23 prevents back flow from the auxiliary reservoir to the brake pipe at a service rate, so that the normal operation of the triple valve device to effect a service application of the brakes is not interfered with.

The passage 20 is also the charging passage for a supplemental or emergency reservoir 30, which is connected to passage 20 through passage 31. It will therefore be apparent that in recharging, the higher retained pressure in the supplemental reservoir prevents the flow of fluid from the brake pipe to the auxiliary reservoir at a high rate since fluid will first flow from the supplemental reservoir to the auxiliary reservoir.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake, the combination with a brake pipe and auxiliary reservoir, of a triple valve device having a full release position and a retarded release position and means for charging the auxiliary reservoir from the brake pipe at the same rate both in the full release and the retarded release positions.

2. In a fluid pressure brake, the combination with a brake cylinder, brake pipe, and auxiliary reservoir, of a triple valve device having a position in which the release of fluid from the brake cylinder is retarded and another release position and means for charging the auxiliary reservoir from the brake pipe at the same rate in both release positions.

3. In a fluid pressure brake, the combination with a brake cylinder, brake pipe, and auxiliary reservoir, of a triple valve device comprising a piston subject to the opposing pressures of the brake pipe and auxiliary reservoir and valve means operated by said piston, said triple valve device having a normal release position and a retarded release position and having a passage leading from the brake pipe side of said piston to the auxiliary reservoir side and providing the only means for charging the auxiliary reservoir from the brake pipe.

4. In a fluid pressure brake, the combination with a brake cylinder, brake pipe, and auxiliary reservoir, of a triple valve device comprising a piston subject to the opposing pressures of the brake pipe and auxiliary reservoir and valve means operated by said piston, said triple valve device having a normal release position and a retarded release position and having a passage leading from the brake pipe side of said piston to the auxiliary reservoir side and controlled by said valve means, said passage being the only means for charging the auxiliary reservoir in both release positions of the triple valve device.

5. In a fluid pressure brake, the combination with a brake cylinder, brake pipe, and auxiliary reservoir, of a triple valve device comprising a piston subject to the opposing pressures of the brake pipe and auxiliary reservoir, and valve means operated by said piston and having a release position in which the release of fluid from the brake cylinder is retarded and a normal release position, said triple valve device having a one way passage providing the only means for charging the auxiliary reservoir from the brake pipe, both in normal and retarded release positions, and provided with a one way passage through which fluid may flow from the auxiliary reservoir to the brake pipe at a restricted rate.

6. In a fluid pressure brake, the combination with a brake cylinder, brake pipe, and auxiliary reservoir, of a triple valve device comprising a piston subject to the opposing pressures of the brake pipe and auxiliary reservoir, and valve means operated by said piston and having a release position in which the release of fluid from the brake cylinder is retarded and a normal release position, said triple valve device having a passage providing the only means for charging the auxiliary reservoir from the brake pipe in both release positions, a check valve for preventing flow from the auxiliary reservoir through said passage to the brake pipe, and said triple valve device having a passage for permitting flow of fluid from the auxiliary reservoir to the brake pipe at a restricted rate, and a check valve in said passage for preventing flow from the brake pipe to the auxiliary reservoir.

7. In a fluid pressure brake, the combination with a brake pipe, auxiliary reservoir and an additional reservoir, of a triple valve device having a full release position and a retarded release position, and means for charging the auxiliary reservoir from the brake pipe at the same rate in full release and retarded release positions through a passage connected to said additional reservoir.

In testimony whereof I have hereunto set my hand, this 15th day of October, 1928.

WILLIAM E. DEAN.